United States Patent
Takizawa et al.

(10) Patent No.: US 11,230,960 B2
(45) Date of Patent: Jan. 25, 2022

(54) FAILURE DETECTION APPARATUS AND FAILURE DETECTION METHOD FOR PARTICULATE FILTER

(71) Applicant: DENSO CORPORATION, Kariya (JP)

(72) Inventors: Kensuke Takizawa, Nisshin (JP); Kazuhiko Koike, Nisshin (JP); Go Miyagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 148 days.

(21) Appl. No.: 16/713,787

(22) Filed: Dec. 13, 2019

(65) Prior Publication Data

US 2020/0116066 A1 Apr. 16, 2020

Related U.S. Application Data (63) Continuation of application No. PCT/JP2018/022452, filed on Jun. 12, 2018.

(30) Foreign Application Priority Data

Jun. 15, 2017 (JP) .............................. JP2017-117948

(51) Int. Cl.
 *F01N 11/00* (2006.01)
 *F02D 41/02* (2006.01)
 (Continued)

(52) U.S. Cl.
 CPC ............ *F01N 11/00* (2013.01); *F02D 41/029* (2013.01); *F02D 41/062* (2013.01);
 (Continued)

(58) Field of Classification Search
 CPC .. F01N 11/00; F01N 2560/05; F01N 2560/20; F02D 41/029; F02D 41/062; F02D 41/1466; F02D 41/1494
 See application file for complete search history.

(56) References Cited

U.S. PATENT DOCUMENTS

| | | | | |
|---|---|---|---|---|
| 9,151,204 | B2* | 10/2015 | Hashida | F02D 41/222 |
| 2013/0283887 | A1* | 10/2013 | Ante | F01N 9/002 |
| | | | | 73/28.01 |
| 2015/0168285 | A1* | 6/2015 | Hedayat | G01N 15/0656 |
| | | | | 73/23.33 |

FOREIGN PATENT DOCUMENTS

| | | |
|---|---|---|
| JP | 5533477 | 6/2014 |
| JP | 2016-205168 | 12/2016 |

* cited by examiner

*Primary Examiner* — Hung Q Nguyen
*Assistant Examiner* — Mark L. Greene
(74) *Attorney, Agent, or Firm* — Nixon & Vanderhye P.C.

(57) ABSTRACT

Failure detection apparatus for a particulate filter includes: a sensor having a particulate matter detection unit that outputs a signal corresponding to the amount of accumulated PM, and a heater unit that heats the particulate matter detection unit; a regeneration control unit that causes the heater unit to heat the particulate matter detection unit to a regeneration temperature allowing the particulate matter to be burned off; a start detection unit that determines the start of the internal combustion engine; failure determination unit that determines whether exhaust gas contains water droplets while the engine is in operation; a heating control unit that causes the heater unit to heat the particulate matter detection unit to a first temperature allowing the accumulated particulate matter to remain and the moisture included in the particulate matter to be removed; and failure determination unit that determines whether the filter has failure based on a sensor output value.

4 Claims, 8 Drawing Sheets

(51) Int. Cl.
*F02D 41/14* (2006.01)
*F02D 41/06* (2006.01)
(52) U.S. Cl.
CPC ..... *F02D 41/1466* (2013.01); *F02D 41/1494* (2013.01); *F01N 2560/05* (2013.01); *F01N 2560/20* (2013.01)

FAILURE DETECTION APPARATUS AND FAILURE DETECTION METHOD FOR PARTICULATE FILTER

CROSS-REFERENCE TO RELATED APPLICATION

This application is the U.S. bypass application of International Application No. PCT/JP2018/022452 filed Jun. 12, 2018 which designated the U.S. and claims priority to Japanese Patent Application No. 2017-117948, filed Jun. 15, 2017, the contents of which are incorporated herein by reference.

TECHNICAL FIELD

The present disclosure relates to failure detection apparatus and failure detection method for a particulate filter that collects particulate matter emitted from an internal combustion engine.

BACKGROUND

Regulations on emissions from automobile engines have been recently tightened, and particulate filters are installed in exhaust passages to collect particulate matter (hereinafter also referred to as PM). Particulate matter is a mixture having conductive soot (i.e., soot particles) as a main component and also including soluble organic fraction (SOF) derived from unburned fuel and engine oil. A PM sensor for detecting particulate matter is desired to be installed for quick detection of failure in a particulate filter.

SUMMARY

A first aspect of the present disclosure is failure detection apparatus for a particulate filter installed in an exhaust passage for an internal combustion engine. The failure detection apparatus includes:
a sensor having a particulate matter detection unit that allows, on its surface, accumulation of particulate matter contained in exhaust gas having passed through the particulate filter and outputs a signal corresponding to the amount of the accumulated particulate matter, and a heater unit that heats the particulate matter detection unit;
a regeneration control unit that activates the heater unit while the internal combustion engine is stopped, to heat the particulate matter detection unit to a regeneration temperature allowing the particulate matter to be burned off;
a start detection unit that determines the start of the internal combustion engine;
a dryness determination unit that determines whether an exhaust gas contains water droplets during the operation of the internal combustion engine;
a heating control unit that, when the internal combustion engine starts after the heating by the regeneration control unit and the exhaust gas is determined to contain no water droplets, activates the heater unit to heat the particulate matter detection unit to a first temperature allowing the accumulated particulate matter to remain and the moisture included in the particulate matter to be removed; and
failure determination unit that determines whether the particulate filter has failure based on an output value from the sensor after the heating by the heating control unit.

A second aspect of the present disclosure is failure detection apparatus for a particulate filter installed in an exhaust passage for an internal combustion engine. The failure detection apparatus includes:
a sensor having a particulate matter detection unit that allows, on its surface, accumulation of particulate matter contained in exhaust gas having passed through the particulate filter and outputs a signal corresponding to the amount of the accumulated particulate matter, and a heater unit that heats the particulate matter detection unit;
an output storage unit that stores an output value from the sensor as the initial value for the next start when or while the internal combustion engine is stopped;
a start detection unit that determines the start of the internal combustion engine;
a dryness determination unit that determines whether exhaust gas contains water droplets while the internal combustion engine is in operation;
a heating control unit that, in response to the exhaust gas being determined to contain no water droplets after the next start of the internal combustion engine, activates the heater unit to heat the particulate matter detection unit to a first temperature allowing the accumulated particulate matter to remain and the moisture included in the particulate matter to be removed; and
failure determination unit that determines whether the particulate filter has failure based on the difference between the initial value and an output value from the sensor after the heating by the heating control unit.

A third aspect of the present disclosure is failure detection method for a particulate filter installed in an exhaust passage for an internal combustion engine. The failure detection method includes:
arranging a sensor downstream of the particulate filter, the sensor having a particulate matter detection unit that allows, on its surface, accumulation of particulate matter contained in exhaust gas having passed through the particulate filter and outputs a signal corresponding to the amount of the accumulated particulate matter, and a heater unit that heats the particulate matter detection unit;
a regeneration step for activating the heater unit while the internal combustion engine is stopped, to heat the particulate matter detection unit to a regeneration temperature allowing the accumulated particulate matter to be burned off;
a start determination step for determining the start of the internal combustion engine after the heating in the regeneration step;
a dryness determination step for determining whether exhaust gas contains water droplets while the internal combustion engine is in operation after the heating in the regeneration step;
a heating step for, in response to the exhaust gas being determined to contain no water droplets in the dryness determination step, activating the heater unit to heat the particulate matter detection unit to a first temperature allowing the accumulated particulate matter to remain and moisture included in the particulate matter to be removed; and
failure determination step for determining whether the particulate filter has failure based on an output value from the sensor after the heating in the heating step.

A fourth aspect of the present disclosure is failure detection method for a particulate filter installed in an exhaust passage for an internal combustion engine. The failure detection method includes:
arranging a sensor downstream of the particulate filter, the sensor having a particulate matter detection unit that allows, on its surface, accumulation of particulate matter contained in exhaust gas having passed through the particulate filter and outputs a signal corresponding to the amount of the accumulated particulate matter, and a heater unit that heats the particulate matter detection unit;

an output storage step for storing an output value from the sensor as the initial value for the next start when or while the internal combustion engine is stopped;

a start determination step for determining the start of the internal combustion engine after the output storage;

a dryness determination step for determining whether exhaust gas contains water droplets while the internal combustion engine is in operation after the next start;

a heating step for, in response to the exhaust gas being determined to contain no water droplets in the dryness determination step, activating the heater unit to heat the particulate matter detection unit to a first temperature allowing the accumulated particulate matter to remain and the moisture included in the particulate matter to be removed; and failure determination step for determining whether the particulate filter has failure based on the difference between the initial value and an output value from the sensor after the heating in the heating step.

DETAILED DESCRIPTION OF THE PREFERRED EMBODIMENTS

An example PM sensor for detecting particulate matter includes an electric resistance sensor element with a pair of electrodes arranged on a surface of an insulating substrate. When the electrodes are electrically interconnected due to accumulation of particulate matter on the element surface, the PM sensor detects current output depending on the amount of the accumulated PM. Some other PM sensors include capacitive sensor elements. For example, such a PM sensor calculates the amount of accumulated PM in accordance with the capacitance between a pair of electrodes, which varies with the accumulation of particulate matter. This kind of PM sensor may be installed downstream of a particulate filter to detect failure based on the sensor output.

Failure detection apparatus including an accumulation-measuring PM sensor typically burns off the particulate matter accumulated on the PM sensor through a regeneration process before a periodic determination process. The regeneration process, during which no determination is performed, shortens the time period for detecting particulate matter. To extend the detection period, for example, JP 5533477 B discloses an apparatus for detecting abnormal PM emissions from an engine. When the engine is stopped, the apparatus causes a heating unit to burn off the particulate matter before the PM sensor diagnoses an abnormality at the start of the engine.

JP 2016-205168 A also discloses an apparatus for diagnosing failure in a filter. The apparatus includes a regeneration control unit for regenerating the PM sensor while the engine is stopped, and a dryness determination unit for determining the dryness of an exhaust pipe to determine whether sensor regeneration is possible. For example, when the engine is stopped without the determination of the dryness, sensor regeneration is canceled. When the engine is started before the completion of sensor regeneration, the sensor regeneration is ended. This control can prevent moisture-induced cracking caused by heating a wet PM sensor, and eliminate the need for or shorten sensor regeneration after starting, thus extending the diagnosis period of time.

When starting the engine, the engine emits a relatively large amount of particulate matter. Thus, as described in JP 5533477 B and JP 2016-205168 A, regeneration is to be performed while the engine is stopped, and failure determination is to be accomplished immediately after the engine starting for early detection of failure in the particulate filter. However, when some time has elapsed from engine stop to restarting, the temperature inside the exhaust pipe may decrease and allows water vapor, contained in the exhaust gas, to condense, causing the PM sensor to be easily become wet.

When the engine starts under a condition with many water droplets inside the exhaust pipe, such as a cold start condition, the water droplets may be carried by an exhaust gas flow and easily collect on the PM sensor. With an increase in the amount of moisture attached together with particulate matter between the pair of electrodes of the sensor element, the moisture may affect the electric resistance and the capacitance and change the sensor output, resulting in a decrease in the detection accuracy. Thus, for cold start, conventional techniques involve the regeneration process after the exhaust pipe becomes dry, and cannot detect particulate matter emitted at the cold start.

In JP 2016-205168 A, the dryness determination is performed at starting. If dryness is not confirmed, the heating is continued at a low temperature without regeneration after the starting. However, until the dryness is confirmed, the heating is maintained at a temperature lower than the regeneration temperature and higher than the exhaust gas temperature to prevent adhesion of particulate matter and moisture, and the dryness confirmation is followed by the start of collecting particulate matter. Thus, this technique is also incapable of detecting particulate matter emitted at cold start. Furthermore, collecting that starts at different points in time may easily cause output variations and errors because no particulate matter adheres until the temperature decreases to a certain degree after the completion of the drying.

In addition, the engine combustion control technology has been recently improved, and PM emissions after warming up continue to decrease significantly. Thus, a technique is needed for detecting PM emissions during cold start to allow early determination of failure in a particulate filter.

An object of the present disclosure is to provide failure detection apparatus for a particulate filter and failure detection method for a particulate filter that enable accurate detection of emitted particulate matter and early detection of failure in a particulate filter installed in an exhaust passage even under a condition with water droplets within the exhaust passage, such as a cold start condition of an internal combustion engine.

A first aspect of the present disclosure is failure detection apparatus for a particulate filter installed in an exhaust passage for an internal combustion engine. The failure detection apparatus includes a sensor having a particulate matter detection unit that allows, on its surface, accumulation of particulate matter contained in exhaust gas having passed through the particulate filter and outputs a signal corresponding to the amount of the accumulated particulate matter, and a heater unit that heats the particulate matter detection unit; a regeneration control unit that activates the heater unit while the internal combustion engine is stopped, to heat the particulate matter detection unit to a regeneration temperature allowing the particulate matter to be burned off; a start detection unit that determines the start of the internal combustion engine; a dryness determination unit that determines whether an exhaust gas contains water droplets during the operation of the internal combustion engine; a heating control unit that, when the internal combustion engine starts after the heating by the regeneration control unit and the exhaust gas is determined to contain no water droplets, activates the heater unit to heat the particulate matter detection unit to a first temperature allowing the accumulated particulate matter to remain and the moisture included in the particulate matter to be removed; and failure determination unit that determines whether the particulate filter has failure based on an output value from the sensor after the heating by the heating control unit.

A second aspect of the present disclosure is failure detection apparatus for a particulate filter installed in an exhaust passage for an internal combustion engine. The failure detection apparatus includes a sensor having a particulate matter detection unit that allows, on its surface, accumulation of particulate matter contained in exhaust gas having passed through the particulate filter and outputs a signal corresponding to the amount of the accumulated particulate matter, and a heater unit that heats the particulate matter detection unit; an output storage unit that stores an output value from the sensor as the initial value for the next start when or while the internal combustion engine is stopped; a start detection unit that determines the start of the internal combustion engine; a dryness determination unit that determines whether exhaust gas contains water droplets while the internal combustion engine is in operation; a heating control unit that, in response to the exhaust gas being determined to contain no water droplets after the next start of the internal combustion engine, activates the heater unit to heat the particulate matter detection unit to a first temperature allowing the accumulated particulate matter to remain and the moisture included in the particulate matter to be removed; and failure determination unit that determines whether the particulate filter has failure based on the difference between the initial value and an output value from the sensor after the heating by the heating control unit.

A third aspect of the present disclosure is failure detection method for a particulate filter installed in an exhaust passage for an internal combustion engine. The failure detection method includes arranging a sensor downstream of the particulate filter, the sensor having a particulate matter detection unit that allows, on its surface, accumulation of particulate matter contained in exhaust gas having passed through the particulate filter and outputs a signal corresponding to the amount of the accumulated particulate matter, and a heater unit that heats the particulate matter detection unit; a regeneration step for activating the heater unit while the internal combustion engine is stopped, to heat the particulate matter detection unit to a regeneration temperature allowing the accumulated particulate matter to be burned off;

a start determination step for determining the start of the internal combustion engine after the heating in the regeneration step; a dryness determination step for determining whether exhaust gas contains water droplets while the internal combustion engine is in operation after the heating in the regeneration step; a heating step for, in response to the exhaust gas being determined to contain no water droplets in the dryness determination step, activating the heater unit to heat the particulate matter detection unit to a first temperature allowing the accumulated particulate matter to remain and moisture included in the particulate matter to be removed; and failure determination step for determining whether the particulate filter has failure based on an output value from the sensor after the heating in the heating step.

A fourth aspect of the present disclosure is failure detection method for a particulate filter installed in an exhaust passage for an internal combustion engine. The failure detection method includes arranging a sensor downstream of the particulate filter, the sensor having a particulate matter detection unit that allows, on its surface, accumulation of particulate matter contained in exhaust gas having passed through the particulate filter and outputs a signal corresponding to the amount of the accumulated particulate matter, and a heater unit that heats the particulate matter detection unit; an output storage step for storing an output value from the sensor as the initial value for the next start when or while the internal combustion engine is stopped; a start determination step for determining the start of the internal combustion engine after the output storage; a dryness determination step for determining whether exhaust gas contains water droplets while the internal combustion engine is in operation after the next start; a heating step for, in response to the exhaust gas being determined to contain no water droplets in the dryness determination step, activating the heater unit to heat the particulate matter detection unit to a first temperature allowing the accumulated particulate matter to remain and the moisture included in the particulate matter to be removed; and failure determination step for determining whether the particulate filter has failure based on the difference between the initial value and an output value from the sensor after the heating in the heating step.

In the failure detection apparatus according to the first aspect, the regeneration control unit activates the heater unit while the internal combustion engine is stopped, to heat the particulate matter detection unit to the predetermined regeneration temperature, burning off the particulate matter. After that, when the start detection unit determines the start of the internal combustion engine, particulate matter accumulates on the particulate matter detection unit until the dryness determination unit determines that no water droplets are contained therein. When the dryness determination unit determines that no water droplets are contained, the heating control unit activates the heater unit to heat the particulate matter detection unit to the predetermined first temperature. The first temperature is a relatively low temperature at which the moisture included in the accumulated particulate matter can be removed but the particulate matter is not removed. This prevents moisture-induced cracking. Furthermore, the absence of water droplets within the exhaust passage causes no adhesion of new moisture. In other words, the output value from the particulate matter detection unit in this state corresponds to the amount of particulate matter including no moisture. On the basis of the output value, the failure determination unit can detect failure in the particulate filter.

Accordingly, even for particulate matter accumulated during cold start, the PM emissions can be detected accurately by selectively removing the moisture included in the particulate matter after the exhaust passage becomes dry. Alternatively, instead of the regeneration by the regeneration control unit, an output value obtained when or while the internal combustion engine is stopped may be determined as the initial value for the next start. Failure determination based on the difference between the initial value and an output value from the particulate matter detection unit can achieve the same effects.

To detect failure using the failure detection apparatus, the regeneration step or the output storage step in the failure detection method according to the third or the fourth aspect may be implemented, followed by the start determination step, the dryness determination step, the heating step, and the failure determination step in this order. This process enables quick failure determination based on an output value under an operational condition with a relatively large amount of PM emitted, allowing highly accurate failure detection for a particulate filter.

As described above, these aspects can provide failure detection apparatus for particulate filter and failure detection method for a particulate filter that enable accurate detection of emitted particulate matter and early detection of failure in a particulate filter installed in an exhaust passage, even under a condition with water droplets within an exhaust passage, such as a cold start condition of an internal combustion engine.

First Embodiment

Figure 1:
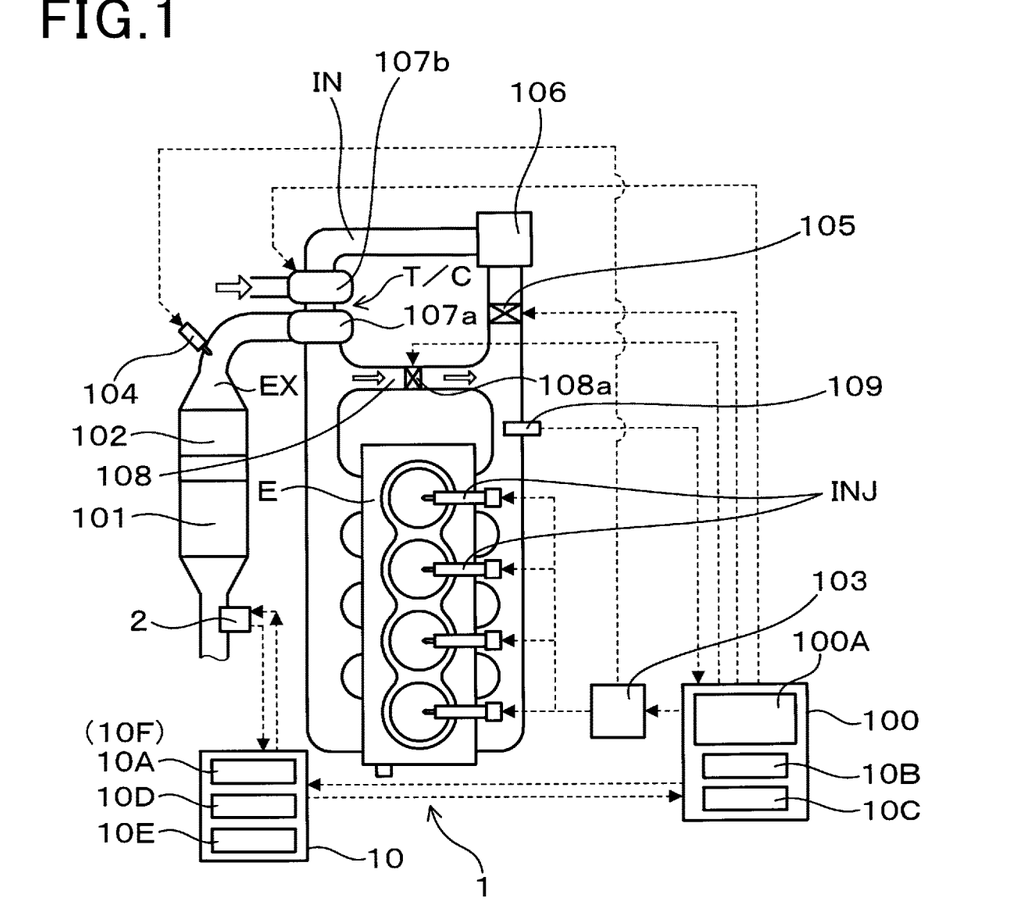
FIG. 1 is a schematic diagram of an internal combustion engine including failure detection apparatus for a particulate filter according to a first embodiment.

A first embodiment of failure detection apparatus for a particulate filter will now be described with reference to FIGS. 1 to 7. As shown in FIG. 1, the internal combustion engine is, for example, a diesel engine (hereinafter referred to as the engine) E, which is a four-cylinder direct injection engine including a turbocharger T/C. The engine has an exhaust pipe EX serving as an exhaust passage and equipped with a particulate filter 101. To detect failure in the particulate filter 101, failure detection apparatus 1 is installed. The exhaust pipe EX has an oxidation catalyst 102 installed upstream of the particulate filter 101. The exhaust pipe EX also has a PM sensor 2, or a sensor, downstream of the particulate filter 101. The sensor collects particulate matter passing downstream through the particulate filter 101, and outputs the signal corresponding to the amount of the accumulated PM.

Figure 2:
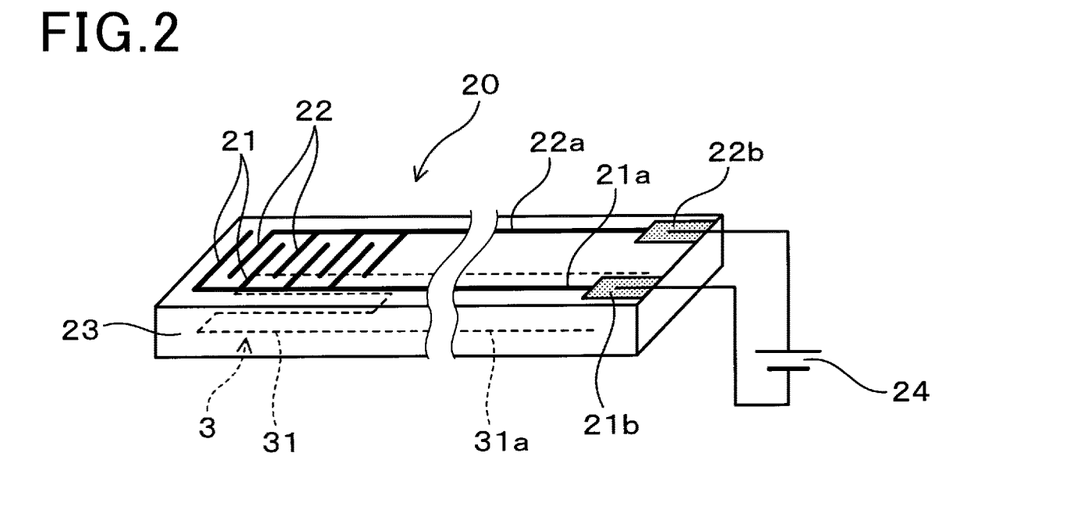
FIG. 2 is a schematic perspective view of an example structure of a sensor element included in a PM sensor according to the first embodiment.

As shown in FIG. 2, the PM sensor 2 includes a sensor element 20, or a particulate matter detection unit. The PM sensor 2 also includes a heater unit 3 integrated with the sensor element 20 for heating the particulate matter accumulated on the sensor element 20. The sensor element 20 has an elongate and rectangular insulating substrate 23 and a pair of interdigital electrodes 21 and 22 on one end part of the substrate surface (e.g., a left-hand part of the upper surface in FIG. 2). The sensor element 20 includes an embedded heater electrode 31, which constitutes the heater unit 3, at a position corresponding to the pair of electrodes 21 and 22. From the pair of electrodes 21 and 22, leads 21a and 22a respectively extend in a longitudinal direction and connect to an external voltage applicator 24 via terminals 21b and 22b at the other end of the sensor element 20, allowing a predetermined voltage for detection to be applied to the pair of electrodes 21 and 22. Similarly, the heater electrode 31 connects to a power supply such as an on-vehicle battery (not shown) via leads 31a and 31b extended to the other end of the sensor element 20. The insulating substrate 23 may be made of alumina or other electrical insulating ceramics. The pair of electrodes 21 and 22 and the heater electrode 31 may be Pt or other noble metal electrodes.

Figure 3:
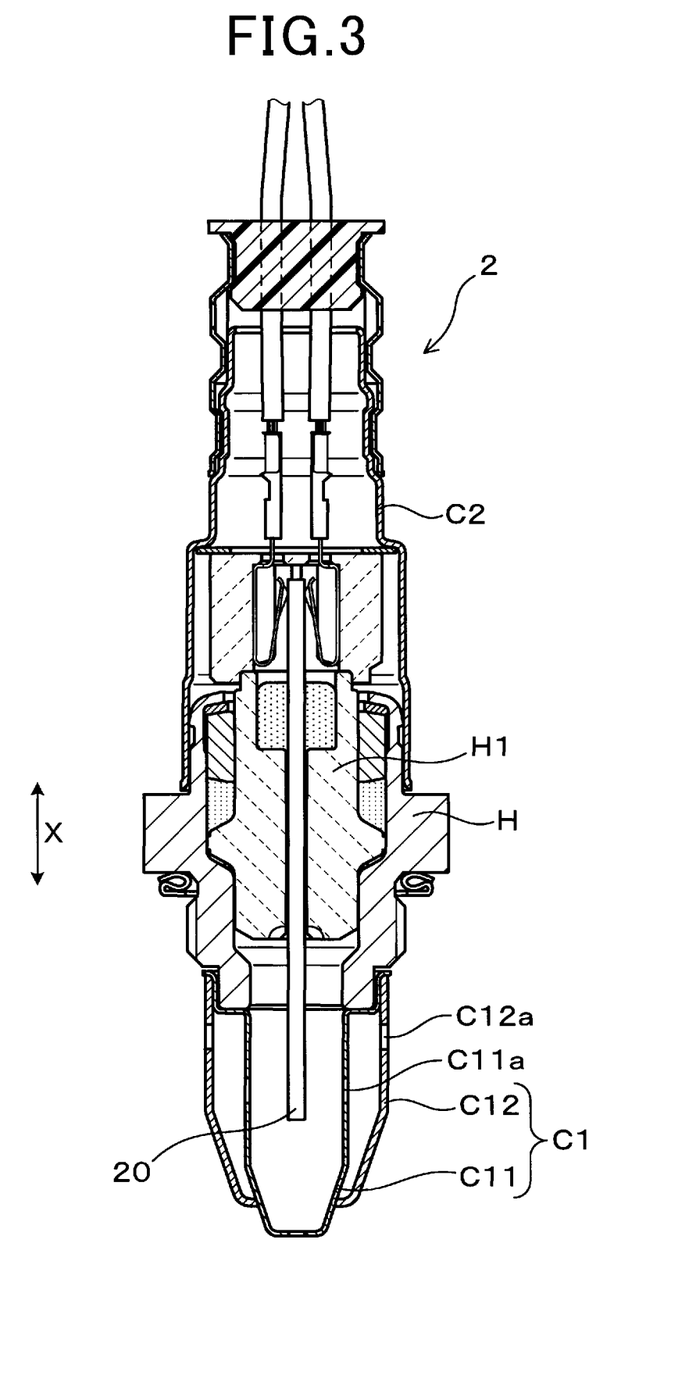
FIG. 3 is a cross-sectional view of the overall PM sensor installed in the failure detection apparatus according to the first embodiment.

As shown in FIG. 3, the PM sensor 2 includes a housing H containing the sensor element 20, a cover C1 installed at the distal end of the housing H to face exhaust gas, and a cover C2 installed at the proximal end to face the atmosphere. The sensor element 20 is secured to the inner periphery of the housing H via a cylindrical insulator H1, with the longitudinal direction of the sensor element 20 aligned with the axial direction X of the PM sensor 2, and with the end part including the pair of electrodes 21 and 22 placed within the exhaust-facing cover C1. The PM sensor 2 is attached to the pipe wall of the exhaust pipe EX (e.g., see FIG. 1) via threads formed in the outer periphery of the housing H. In this state, while protected by the exhaust-facing cover C1, the one end of the sensor element 20 protrudes into the exhaust pipe EX and is exposed to exhaust gas flowing in the exhaust pipe EX. The exhaust-facing cover C1 may be a double container including an inner cover C11 and an outer cover C12 and allowing exhaust gas to flow through holes C11a and C12a cut in the covers C11 and C12, respectively.

Figure 4:
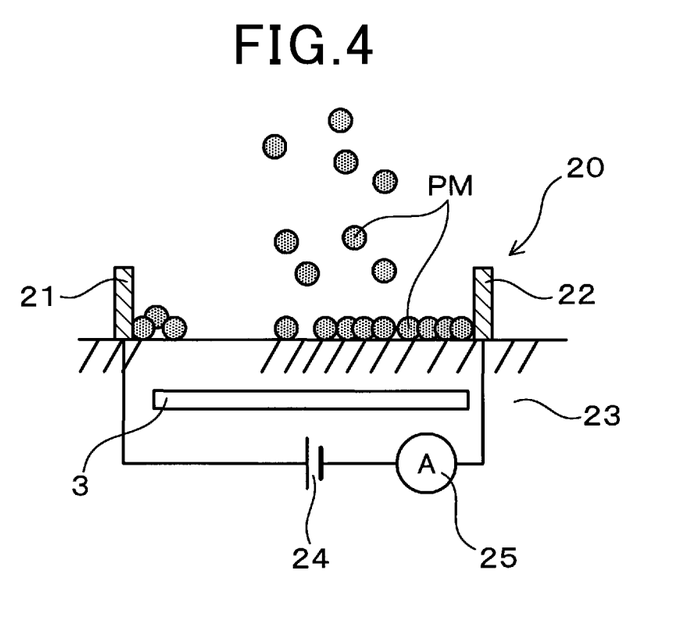
FIG. 4 is a schematic diagram of a main part of the sensor element, illustrating the detection principle of the PM sensor according to the first embodiment.

The principle of PM amount detection by the PM sensor 2 will now be described with reference to FIG. 4. The electric resistance PM sensor 2 has the pair of electrodes 21 and 22 facing and spaced from each other on one surface of the insulating substrate 23 of the sensor element 20. During detection, the voltage applicator 24 may apply the predetermined voltage for detection between the pair of electrodes 21 and 22. The resulting electric field generated between the pair of electrodes 21 and 22 electrostatically collects particulate matter floating near the sensor element 20 (i.e., PM in the drawing). The conductive particulate matter, which is gradually accumulated on the surface of the insulating substrate 23, connects the electrodes 21 and 22 to each other to form a conductive path. Thus, the output characteristics exhibit a dead time for which a sensor output is zero until the formation of the conductive path. Note that particulate matter may be accumulated between the pair of electrodes 21 and 22 not only by electrostatic collecting, but also by thermophoresis or physical collision.

Afterwards, when the sensor output rises, the interelectrode resistance decreases with increasing amount of accumulated PM. Thus, the value of a current flowing at this time can be detected with an ammeter 25 to obtain the output value corresponding to the amount of the accumulated PM. In addition, failure determination for the particulate filter 101 is allowed based on the amount of the accumulated PM by setting a predetermined threshold equal to or greater than the amount of the PM accumulated for the dead time or using the length of the dead time as a parameter.

In FIG. 1, the PM sensor 2 outputs detection signals, which are successively received by a sensor control unit 10 connected to an engine control unit (hereinafter referred to as the ECU) 100.

The sensor control unit 10 includes a regeneration control unit 10A. While the engine E is stopped, the regeneration control unit 10A activates the heater unit 3 to heat the sensor element 20 to a regeneration temperature T allowing the particulate matter to be burned off.

The engine control unit 100 includes a start detection unit 10B for detecting the start of the engine E and a dryness determination unit 10C for determining whether the exhaust gas contains water droplets while the engine E is in operation.

The sensor control unit 10 includes a heating control unit 10D for heating based on the determination results received from the above units. When the engine E starts after the heating by the regeneration control unit 10A and the exhaust gas is determined to contain no water droplets, the heating control unit 10D activates the heater unit 3 to heat the sensor element 2 to a first temperature T1 allowing the accumulated particulate matter to remain and the moisture included in the particulate matter to be removed.

The sensor control unit 10 also includes failure determination unit 10E for determining whether the particulate filter 101 has failure after the heating by the heating control unit 10D. The determination is based on an output value (hereinafter sometimes referred to as a sensor output value) S from the PM sensor 2.

The failure detection procedure performed by the failure detection apparatus 1 with these units will be described in detail later.

The engine E includes a fuel injection valve INJ for each cylinder. Each fuel injection valve INJ is driven by a drive unit 103, which receives an instruction from the ECU 100, to directly inject fuel into the combustion chamber. The exhaust gas after combustion flows into an exhaust passage EX, and purified before passing through the oxidation catalyst 102 and the particulate filter 101. The particulate filter 101 may have a known wall-flow filter structure to collect the particulate matter contained in exhaust gas. More specifically, the particulate filter 101 suitably has a porous ceramic honeycomb structure made of cordierite or other materials and including a large number of inner cells serving as gas flow channels, with the inlets or the outlets of the many cells alternately plugged.

The oxidation catalyst 102 may be formed of oxidation catalyst components supported on the surface of a carrier that has a porous ceramic honeycomb structure made of cordierite or other materials. Upstream of the oxidation catalyst 102, a fuel addition valve 104 is installed to add fuel to the exhaust gas. For example, during the regeneration of the particulate filter 101, fuel can be fed from the fuel addition valve 104 and combusted on the oxidation catalyst 102 to raise the temperature of the exhaust gas.

In an intake pipe IN, serving as an intake passage, an airflow meter 106 for detecting the intake airflow rate is installed upstream of a throttle valve 105 for adjusting the intake airflow rate in accordance with the degree of accelerator opening. The turbocharger 107 has a turbine 107a installed in the exhaust pipe EX, and the turbine 107a drives a compressor 107b installed in the intake pipe IN to compress the intake air to a predetermined boost pressure. The exhaust pipe EX and the intake pipe IN are connected by an EGR passage 108 having an EGR valve 108a, and exhaust gas is recirculated into the intake pipe IN at a flow rate that depends on the opening degree of the EGR valve 108a. The intake pipe IN has an intake pressure sensor 109 installed downstream of the EGR passage 108.

The ECU 100 receives detection signals from the airflow meter 106 and the intake pressure sensor 109 as well as from various sensors such as an accelerator opening sensor and an engine speed sensor (not shown) through an input-output interface 100A. The ECU 100 determines the operating conditions of the engine E based on the detection signals from these various sensors, and controls the engine components to achieve the optimum engine combustion state in accordance with a prestored program and a map value for each operational condition. In response to instruction signals from the ECU 100, the drive unit 103 drives the fuel injection valves INJ, the fuel addition valve 104, the throttle valve 105, the turbine 107a, and the EGR valve 108a at their predetermined points in time. This control allows the boost pressure and the EGR level to be regulated in an appropriate manner, reducing the particulate matter and NOx emitted together with exhaust gas. In addition, the particulate filter 101 installed in the exhaust pipe EX collects particulate matter, thus curbing PM releases into the outside.

However, if some failure occurs in the particulate filter 101, the collecting capability of the particulate filter 101 may decrease, letting particulate matter flow downstream. The term "failure" in the particulate filter 101 may include a partial loss of function due to a fissure in the porous ceramic honeycomb structure constituting the particulate filter 101, a decrease in the collecting efficiency due to a tiny crack or deterioration, and also other abnormalities. To detect such failure quickly and notify the driver, the failure detection apparatus 1 causes the PM sensor 2 to detect particulate matter leaking downstream of the particulate filter 101, and the sensor control unit 10 to perform failure determination.

In more detail, the failure detection apparatus 1 detects failure in the particulate filter 101 by causing the regeneration control unit 10A, the start detection unit 10B, the dryness determination unit 10C, the heating control unit 10D, and the failure determination unit 10E to sequentially implement a regeneration step, a start determination step, a dryness determination step, a heating step, and failure determination step described below.

More specifically, in response to the engine E being determined to be stopped, the regeneration control unit 10A activates the heater unit 3 while the engine E is stopped, to implement the regeneration step for regenerating the sensor element 20. In this step, the sensor element 20 is heated to the regeneration temperature T, which allows the accumulated particulate matter to be burned off.

Next, the start detection unit 10B implements the start determination step for detecting the start of the engine E after the heating in the regeneration step. In response to the start of the engine E, the sensor element 20 starts collecting particulate matter.

Then, while the engine E is in operation after the heating in the regeneration step, the dryness determination unit 10C implements the dryness determination step for determining whether exhaust gas contains water droplets.

After that, when no water droplets are determined to be contained in the dryness determination step, the heating control unit 10D implements the heating step for activating the heater unit 3 to heat the sensor element 20. In this step, the sensor element 20 is heated to the first temperature T1, which allows the accumulated particulate matter to remain and the moisture included in the particulate matter to be removed.

After the heating in the heating step, the failure determination unit 10E implements the failure determination step for determining whether the particulate filter 101 has failure, based on an output value S from the PM sensor 2.

Figure 5:
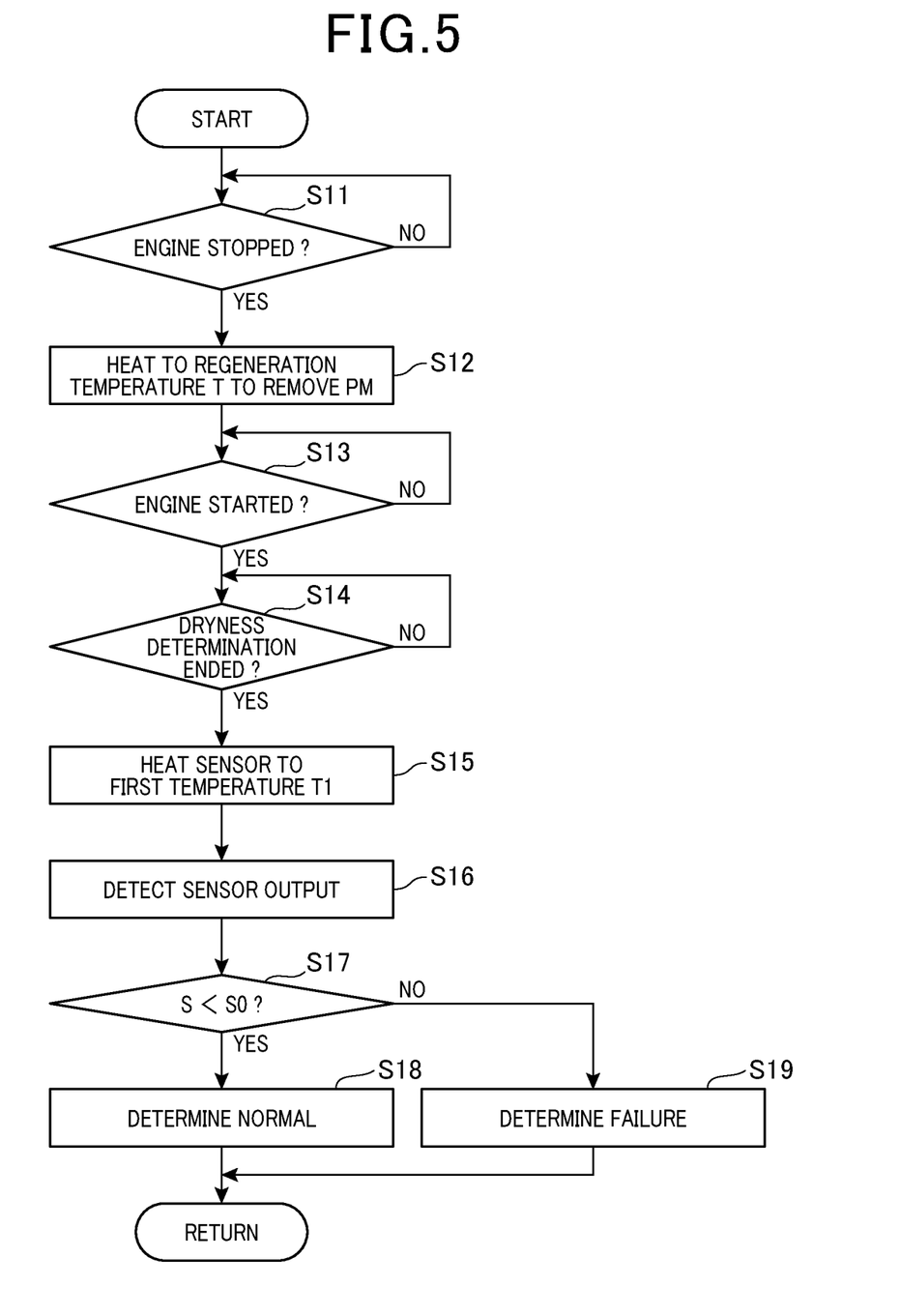
FIG. 5 is a flowchart of failure detection procedure for a particulate filter, performed by the failure detection apparatus according to the first embodiment.

These steps will now be described in detail. FIG. 5 shows a flowchart as an example of the failure detection procedure performed periodically by the failure detection apparatus 1. Step S12 corresponds to the regeneration step, step S13 to the start determination step, step S14 to the dryness determination step, step S15 to the heating step, and steps S16 to S19 to the failure determination step.

When the failure detection procedure is started, the failure detection apparatus 1 first determines whether the engine E has stopped in step S11. In step S11, if an affirmative determination result is provided, the procedure proceeds to step S12 to regenerate the PM sensor 2. If a negative determination result is provided, step S11 is repeated until an affirmative determination result is provided.

The stop of the engine E includes, but not limited to, the case in which the ignition is switched off by the driver operating the engine switch or the engine key and the case in which the engine speed detected by the engine speed sensor has become zero. A vehicle with a start-stop function senses idling while stopped, and then its engine E automatically stops. However, the vehicle is expected to restart in a very short time, and wetting is less likely to occur. Additionally, to prevent incomplete regeneration in the next step, an automatic stop due to idling desirably leads to no affirmative determination result in step S11.

Figure 6:
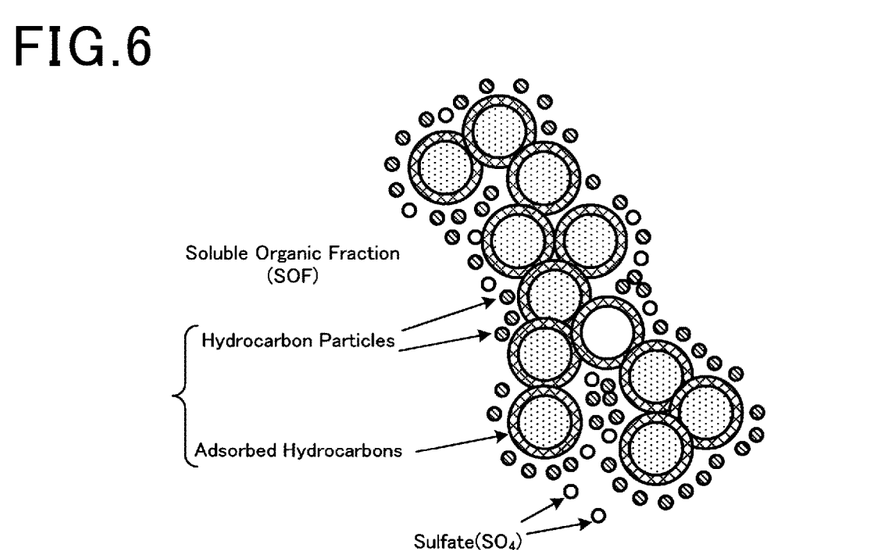
FIG. 6 is a schematic diagram illustrating the structure of particulate matter according to the first embodiment.

In step S12, the heater unit 3 incorporated in the sensor element 20 of the PM sensor 2 is activated to heat the sensor element 20 to the regeneration temperature T, which allows the particulate matter on the surface to be burned off. As shown in FIG. 6, the particulate matter contained in exhaust gas includes soot, or soot particles that are conductive carbon components. The particulate matter also includes nonconductive components attached to the soot surfaces, such as SOF including film-like hydrocarbons (i.e., adsorbed hydrocarbons) and particulate hydrocarbons (i.e., hydrocarbon particles) derived from unburned fuel and oil. The particulate matter further includes sulfate that contains water and a sulfur oxide derived from sulfur in the fuel. In step S12, the regeneration temperature T is desirably set at a temperature of 600° C. or higher (e.g., 700° C.) at which soot can be burned off. This enables the particulate matter to be fully burned off.

In this manner, while the engine E is stopped, the temperature can be increased to the preset regeneration temperature T and maintained for a predetermined time period to reset the PM sensor 2. The dryness determination may also be prior to step S12 so that the PM sensor 2 is regenerated only under conditions that prevent the PM sensor 2 from being wetted. In an example of the dryness determination, the exhaust gas temperature in the exhaust pipe EX is detected with an exhaust gas temperature sensor (not shown). The dryness can be confirmed when the exhaust gas temperature is equal to or higher than a predetermined temperature (e.g., 100° C.) at which the condensed water in the exhaust pipe EX is evaporable. The exhaust gas temperature may also be estimated from the operating conditions of the engine E that is stopped. In some cases, the dryness determination may be based on detection results received from a coolant temperature sensor (not shown) for the engine E or on the operating time before the stop of the engine E.

After the regeneration of the PM sensor 2 in step S12, the procedure proceeds to step S13 to determine whether the engine E has started. In step S13, for example, the start of the engine E can be confirmed when the ignition is switched on by the driver operating the engine switch or the engine key or the engine speed detected by the engine speed sensor increases from zero to a predetermined value or more. Suitably, an affirmative determination result is provided in step S13 desirably on the condition that the start is a cold start, at which the PM sensor 2 may be wetted. The cold start of the engine E may be determined based on, for example, detection signals from the exhaust gas temperature sensor (not shown) and the coolant temperature sensor for the engine E or on the time elapsed from the stop of the engine E.

When the engine E starts and an affirmative determination result is provided in step S13, the PM sensor 2 starts collecting particulate matter. In an example of electrostatic collecting, the voltage applicator 24 applies a voltage for detection between the pair of electrodes 21 and 22 of the sensor element 20. The exhaust gas sent into the exhaust pipe EX at the start of the engine E passes through the particulate filter 101 and reaches the PM sensor 2. At this time, if the particulate filter 101 has some failure, the particulate matter in the exhaust gas leaks downstream without being collected. The particulate matter leaking downstream is accumulated on the surface of the sensor element 20, which has the pair of electrodes 21 and 22. The amount of the accumulated PM can be detected as a change in the resistance between the pair of electrodes 21 and 22 to detect the failure in the particulate filter 101.

If a relatively long time has elapsed after the stop of the engine E in step S11, the engine E has a lowered temperature and falls into a cold start condition before restarting in step S13. In this case, the exhaust gas contains a relatively large amount of particulate matter, and its moisture condenses into water droplets and enters the exhaust pipe EX. In addition, when the exhaust gas remaining in the exhaust pipe EX comes into contact with the wall surface, the water vapor in the exhaust gas condenses into water droplets. When the water droplets are carried by the exhaust gas and come inside through the hole C11a in the exhaust-facing cover C1 for the PM sensor 2, the droplets adhere to the surface of the sensor element 20 together with particulate matter.

With the sensor element 20 wetted in this manner, the amount of PM cannot be detected with accuracy, and particulate matter continues to be collected until the PM amount becomes detectable. Thus, when an affirmative determination result is provided in step S13, the procedure proceeds to step S14 to determine dryness. The dryness determination result is used to determine whether the termination condition of the dryness determination is satisfied. The termination condition of the dryness determination is the case in which the dryness determination is performed for determining whether the exhaust gas contains water droplets, and the determination result indicates that the exhaust gas contains no water droplets. The dryness determination can be performed in the same manner as in step S12. For example, the exhaust gas temperature in the exhaust pipe EX is detected with the exhaust gas temperature sensor or estimated from the operating conditions of the engine E. The dryness can be confirmed when the temperature is equal to or higher than a predetermined temperature (e.g., 100° C.) at which the moisture in the exhaust pipe EX is evaporable. In some cases, the dryness determination may be based on detection results received from the coolant temperature sensor (not shown) for the engine E or the operating time before the stop of the engine E.

In step S14, if a negative determination result is provided, the dryness determination is repeated in step S14 until an affirmative determination result is provided. When the dryness with no water droplets are confirmed, the dryness determination is ended, and the procedure proceeds to step S15. In step S15, the heater unit 3 incorporated in the sensor element 20 of the PM sensor 2 is activated to heat the sensor element 20 to the predetermined first temperature T1, removing the moisture on the surface. The first temperature T1, which allows the accumulated particulate matter to remain and the moisture included in the particulate matter to be removed, is desirably set at a temperature falling within the range of 100° C. to 500° C. (e.g., 200° C.). With the first temperature T1 lower than 100° C., the moisture may not evaporate completely. With the first temperature T1 higher than 500° C., the particulate matter may be combusted.

Alternatively, in step S15, the sensor element 20 may be heated not to the first temperature T1 but to a predetermined second temperature T2, removing the moisture and the SOF on the surface. The second temperature T2 may be set at a temperature of more than 200° C. and less than 500° C. (e.g., 300° C.). An increase in nonconductive SOF content may significantly affect the conductive-soot-based output of the sensor element 20, leading to a decrease in the output sensitivity and output variations. In this case, the amount of the accumulated PM can be detected with higher accuracy by heating at the second temperature T2, at which the moisture and also the nonconductive SOF are removed while the conductive soot is allowed to remain. With the second temperature T2 equal to or lower than 200° C., the SOF may be removed insufficiently. With the second temperature T2 higher than 500° C., the particulate matter may be combusted.

In step S15, the heating at the first temperature T1 or the second temperature T2 for a predetermined time period can remove the moisture included in the particulate matter or the moisture and the SOF. Then, the procedure proceeds to step S16 to detect the sensor output. In step S16, an output value S from the PM sensor 2 is read and in step S17, compared with a predetermined threshold S0 to determine whether the sensor output value S is lower than the predetermined threshold S0 (i.e., S<S0?).

The threshold S0 is a predetermined value higher than sensor output obtained when the particulate filter 101 is normal. The threshold S0 is determined based on the results of a preliminary real machine test, with changes in the intake airflow rate or other operational conditions taken into account. The threshold S0 may be stored, for example, in a storage area of the sensor control unit 10 or the ECU 100 as a map value for each intake airflow rate detected by the airflow meter 106. Alternatively, a computation unit in the ECU 100 may calculate the threshold S0 using the intake airflow rate as a parameter, and output each calculated threshold S0 to the sensor control unit 10.

If an affirmative determination result is provided in step S17, the procedure proceeds to step S18 to determine that the particulate filter 101 is normal. If a negative determination result is provided in step S17, the procedure proceeds to step S19 to determine that the particulate filter 101 has some failure. Then, this procedure cycle is ended.

The effects of the failure detection procedure followed in accordance with the flowchart of FIG. 5 will now be described with reference to the timing chart of FIG. 7. The particulate filter 101 used was a reference failed diesel particulate filter (hereinafter referred to as the reference failed DPF) having a PM collecting efficiency lower than a predetermined reference value. The reference failed DPF was installed in the exhaust pipe EX for the engine E, and the PM sensor 2 was installed downstream on the pipe wall. PM emissions and time-varying sensor output values S from the PM sensor 2 after the cold start of the engine E were compared with those in a known failure detection procedure (i.e., comparative example 1 at the middle part of this chart). In the failure detection procedure according to comparative example 1, the sensor is regenerated after the engine E starts and the exhaust pipe EX is determined to have been dried. Then, PM is collected, and sensor output values S are used to determine failure or normal.

Figure 7:
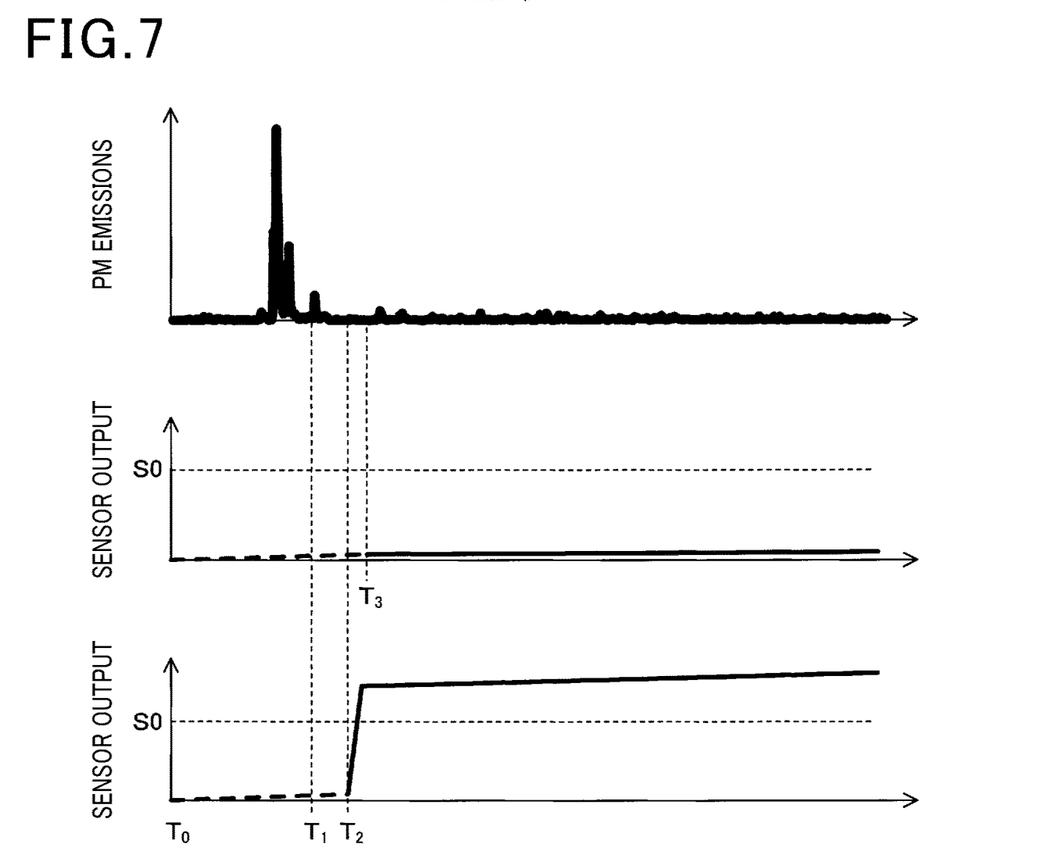
FIG. 7 is a timing chart showing a comparison of time-varying output values from the PM sensor according to the first embodiment with time-varying output values according to failure detection process in comparative example 1.

The upper part of FIG. 7 shows variations in the PM concentration inside the exhaust pipe EX. The engine E starts at time T0, and then fuel is injected into the combustion chamber of the engine E. The combustion of the fuel increases the amount of exhaust gas entering the exhaust pipe EX. As a result, the PM emissions sharply increase in a certain time period after time T0. Then, the exhaust gas temperature rises as the combustion continues, and thus the PM emissions sharply decrease. This occurs at about time T1, at which the exhaust pipe EX becomes dry and from which PM emissions are negligible. In comparative example 1 shown in the middle part of FIG. 7, the sensor element 20 is heated for sensor regeneration (e.g., at 700° C.) after the sharp decrease in the PM emissions, and the regeneration ends at time T3, after which PM accumulation starts.

However, at time T3, a considerable amount of PM has already been emitted as a result of the cold start of the engine E. In addition, the PM emissions after warming up are negligible. Thus, the sensor output does not rise, and sensor output values S after time T3 remain much lower than the threshold S0. This hinders correct detection of failure of the particulate filter 101g. In comparative example 1, during the period from the engine start to the end of the sensor regeneration, or times T0 to T3, no voltage is applied for detection of sensor output signals, and thus the sensor output is zero.

By contrast, in the first embodiment shown in the lower part of FIG. 7, the engine E starts at time T0, after which PM accumulation starts. When the dryness determination ends at time T1, heating is started to remove the moisture (e.g., at 200° C.), and the moisture removal ends at time T2, prior to time T3. In this state, of the substances accumulated on the PM sensor 2 during the period from time T0 to time T1, the moisture is selectively removed, and the particulate matter, or a conductive component, remains. During the period from time T0 to time T2, at which the moisture removal by the heating ends, no voltage is applied for detection of sensor output signals, and the sensor output value S is zero. Then, when the detection of output signals from the PM sensor 2 is started, the sensor output value S rises quickly due to the PM emitted during the cold start and exceeds the predetermined threshold S0. As described above, the threshold S0 corresponds to a PM amount that allows the determination that the particulate filter 101 has failure, and thus failure is confirmed when the sensor output reaches the threshold S0.

Accordingly, the sensor output value S in the first embodiment represents the PM emissions even during cold start and can be compared with the predetermined threshold S0 to detect failure in the particulate filter 101 with high accuracy.

Second Embodiment

A second embodiment of failure detection apparatus for a particulate filter will now be described with reference to FIGS. 8 to 10. The sensor element 20 included in the PM sensor 2 may be any sensor element that generates sensor output when particulate matter accumulates on the element surface, or more specifically, a sensor element 20 for generating sensor output intermittently or discontinuously or a sensor element 20 for generating sensor output continuously. In the first embodiment, the electric resistance sensor element 20 is used to describe an example of generating sensor output intermittently. In the present embodiment, a capacitive sensor element 20 is used to describe an example of generating sensor output continuously. The failure detection apparatus 1 and the PM sensor 2 in this embodiment have the same basic structures as described in the first embodiment, and will not be illustrated. Differences will now be mainly described.

Unless otherwise specified, when a reference numeral used in the second and subsequent embodiments is the same as a reference numeral used in a preceding embodiment, it indicates the same component or element as indicated by the reference numeral in the preceding embodiment.

Figure 8:
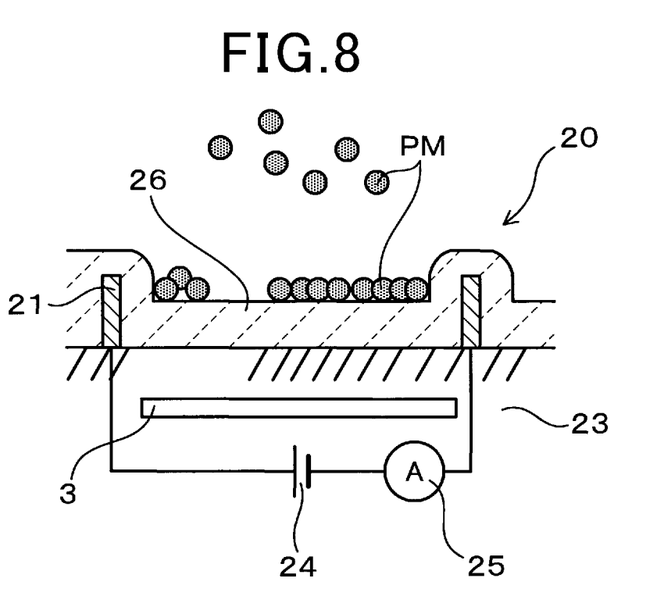
FIG. 8 is a schematic diagram of a main part of a sensor element, illustrating the detection principle of a PM sensor according to a second embodiment.
Figure 9:
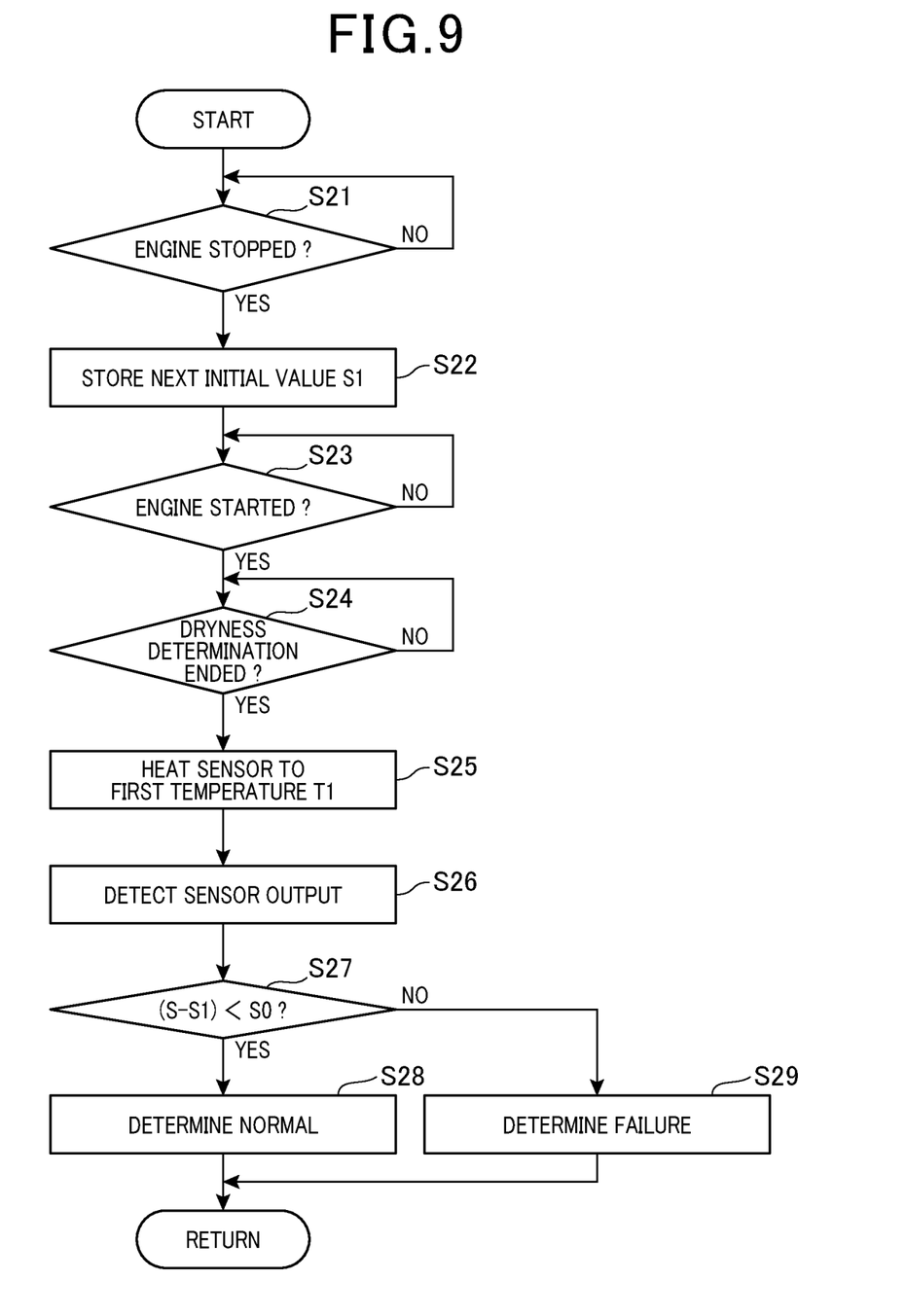
FIG. 9 is a flowchart of failure detection procedure for a particulate filter, performed by failure detection apparatus according to the second embodiment.

As shown in FIG. 8, the capacitive sensor element 20, for example, may include the same pair of electrodes 21 and 22 as described in the first embodiment and detect a change in the interelectrode capacitance in place of a change in the interelectrode resistance. More specifically, the sensor element 20 has a dielectric layer 26 formed on its surface in a manner to cover the pair of electrodes 21 and 22, and particulate matter (i.e., PM in FIG. 7) accumulates on the dielectric layer 26. The capacitance C between the pair of electrodes 21 and 22 can generally be expressed by formula 1:

$$C = \varepsilon \times (S/d) \qquad \text{(Formula 1)}$$

where $\varepsilon$ denotes a dielectric constant, S denotes the surface area of the electrodes 21 and 22, and d denotes the distance between the electrodes 21 and 22.

In formula 1, since the surface area S of the electrodes 21 and 22 is constant, the capacitance C changes with a change in the dielectric constant $\varepsilon$ between the electrodes 21 and 22 caused by accumulation of particulate matter on the dielectric layer 26.

Thus, measuring the capacitance C between the pair of electrodes 21 and 22 allows the amount of the accumulated PM to be detected based on output values S from the PM sensor 2. In addition, output values S from the PM sensor 2 can be used to determine the particulate filter 101 to be failed or normal.

In the present embodiment, although the sensor output may be returned to the initial value (i.e., output value S=0) as described in the first embodiment, the amount of the accumulated PM can be detected based on a difference between continuously generated sensor outputs without returning to the initial value. In this case, while the engine E is stopped, the sensor output is stored as a next initial value S1 without sensor regeneration.

To store the sensor output, the failure detection apparatus 1 in the present embodiment includes an output storage unit 10F in the sensor control unit 10 in place of the regeneration control unit 10A shown in FIG. 1.

When or while the engine E is stopped, the output storage unit 10F stores an output value from the PM sensor 2 as an initial value S1 for the next start.

The ECU 100 also includes the start detection unit 10B for detecting the start of the engine E, and the dryness determination unit 10C for determining whether exhaust gas contains water droplets while the engine E is in operation. The sensor control unit 10 also includes the heating control unit 10D and the failure determination unit 10E. In response to the exhaust gas being determined to contain no water droplets after the next start of the engine E, the heating control unit 10D activates the heater unit 3 to heat the sensor element 2 to the first temperature T1 allowing the accumulated particulate matter to remain and the moisture included in the particulate matter to be removed. After the heating by the heating control unit 10D, the failure determination unit 10E determines whether the particulate filter 101 has failure. The determination is based on the difference between the initial value S1 and an output value S from the PM sensor 2.

If the sensor output is returned to the initial value as described in the first embodiment, the sensor control unit 10 may also include the same regeneration control unit 10A as in the first embodiment. While the engine E is stopped, the regeneration control unit 10A activates the heater unit 3 to heat the sensor element 20 to the regeneration temperature T, which allows the particulate matter to be burned off. In this case, the heating control unit 10D and the failure determination unit 10E also perform their processing in the same manner as described in the first embodiment.

In more detail, the failure detection apparatus 1 detects failure in the particulate filter 101 by causing the output storage unit 10F, the start detection unit 10B, the dryness determination unit 10C, the heating control unit 10D, and the failure determination unit 10E to sequentially implement an output storage step, a start determination step, a dryness determination step, a heating step, and failure determination step described below.

More specifically, in response to the engine E being determined to be stopped, the output storage unit 10F implements the output storage step for storing an output value S from the PM sensor 2 as the initial value S1 for the next start when or while the engine E is stopped.

Next, the start detection unit 10B implements the start determination step for detecting the start of the engine E after the output storage step. In response to the start of the engine E, the sensor element 20 starts collecting particulate matter.

Then, while the engine E is in operation after the next start, the dryness determination unit 10C implements the dryness determination step for determining whether exhaust gas contains water droplets.

After that, when no water droplets are determined to be contained in the dryness determination step, the heating control unit 10D implements the heating step for activating the heater unit 3 to heat the sensor element 20. In this step, the sensor element 20 is heated to the first temperature T1, which allows the accumulated particulate matter to remain and the moisture included in the particulate matter to be removed.

After the heating in the heating step, the failure determination unit 10E implements the failure determination step for determining whether the particulate filter 101 has failure, based on the difference between the initial value S1 and an output value S from the PM sensor 2.

These steps will now be described in detail. FIG. 9 shows a flowchart as an example of the failure detection procedure performed periodically by the failure detection apparatus 1. Step S22 corresponds to the output storage step, step S23 to the start determination step, step S24 to the dryness determination step, step S25 to the heating step, and steps S26 to S29 to the failure determination step.

When the failure detection procedure is started, the failure detection apparatus 1 first determines whether the engine E has stopped in step S21. The stop of the engine E can be determined in the same manner as in step S11 of the first embodiment. In step S21, if an affirmative determination result is provided, the procedure proceeds to step S22. If a negative determination result is provided, step S21 is repeated until an affirmative determination result is provided.

In step S22, the output value S at this time from the PM sensor 2 is stored in, for example, a storage area of the sensor control unit 10 as the initial value S1 for the next start. The procedure then proceeds to step S23 to determine whether the engine E has started. The start of the engine E can be detected in the same manner as in step S13 of the first embodiment. Suitably, an affirmative determination result is provided in step S23 desirably on the condition that the start is cold start, at which the PM sensor 2 may be wetted.

When the engine E starts and an affirmative determination result is provided in step S23, a voltage for detection is applied, for example, between the pair of electrodes 21 and 22 of the sensor element 20, allowing the PM sensor 2 to start collecting particulate matter. The procedure then proceeds to step S24 to determine dryness in the same manner as in step S14 of the first embodiment and also determine whether the termination condition of the dryness determination is satisfied. In step S24, if a negative determination result is provided, the dryness determination is repeated in step S24 until an affirmative determination result is provided. When the dryness with no water droplets are confirmed, the dryness determination is ended, and the procedure proceeds to step S25.

In step S25, the heater unit 3 incorporated in the sensor element 20 of the PM sensor 2 is activated. The activated heater unit 3 heats the sensor element 20 to the predetermined first temperature T1 (e.g., 200° C.) in the same manner as in step S25 of the first embodiment, removing the moisture on the surface. Alternatively, in step S25, the sensor element 20 may be heated not to the first temperature T1 but to the predetermined second temperature T2 (e.g., 300° C.), removing the moisture and the SOF on the surface.

In step S25, the heating at the first temperature T1 or the second temperature T2 for a predetermined time period can remove the moisture included in the particulate matter or the moisture and the SOF. Then, the procedure proceeds to step S26 to detect the sensor output. In step S26, a sensor output value S from the PM sensor 2 is read, and the initial value S1 stored in step S22 is used to calculate the difference between the sensor output value S and the initial value S1, that is, S−S1. Then, the procedure proceeds to step S27 to read the predetermined threshold S0 and determine whether the difference, S−S1, is lower than the predetermined threshold S0 (i.e., S−S1<S0?). The threshold S0 is determined as appropriate through a preliminary real machine test for the PM sensor 2 including the capacitive sensor element 20.

If an affirmative determination result is provided step S27, the procedure proceeds to step S28 to determine that the particulate filter 101 is normal. If a negative determination result is provided in step S27, the procedure proceeds to step S29 to determine that the particulate filter 101 has some failure. Then, this procedure cycle is ended.

The effects of the failure detection procedure followed in accordance with the flowchart of FIG. 9 will now be described with reference to the timing chart of FIG. 10. Also in this case, the particulate filter 101 used in a test was the same reference failed DPF as mentioned in the first embodiment. In the test, PM emissions and time-varying output values from the PM sensor 2 after cold start of the engine E were compared with those in a known failure detection procedure (i.e., comparative example 2 at the middle part of this chart).

In comparative example 2, the PM sensor 2 included the capacitive sensor element 20 capable of outputting sensor signals continuously, as in the second embodiment. The failure determination was otherwise similar to that in comparative example 1. More specifically, the sensor is regenerated after the engine E starts and the exhaust pipe EX is determined to have been dried. Then, sensor output values S obtained after PM is collected are used for failure determination.

Figure 10:
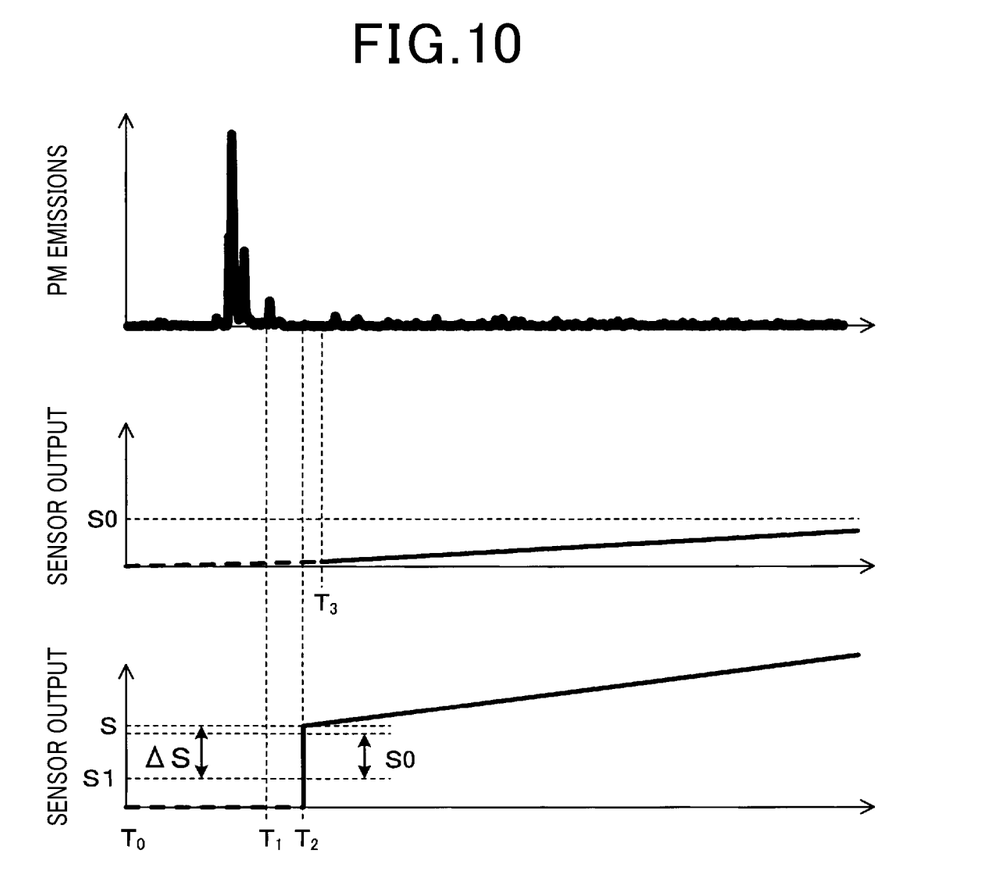
FIG. 10 is a timing chart showing a comparison of time-varying output values from a PM sensor according to the second embodiment with time-varying output values according to the failure detection procedure in comparative example 2.

The upper part of FIG. 10 shows variations in the PM concentration inside the exhaust pipe EX, which are similar to those in FIG. 7. The engine E starts at time T0, and the PM emissions sharply increase in a certain time period after time T0. Then, the PM emissions sharply decrease. This occurs at about time T1, at which the exhaust pipe EX becomes dry and from which PM emissions are negligible. In comparative example 2 shown in the middle part of FIG. 10, the sensor element 20 is heated for sensor regeneration (e.g., at 700° C.) after the sharp decrease in the PM emissions, and the regeneration ends at time T3, after which PM accumulation starts.

Thus, in comparative example 2, until the end of the sensor regeneration, or during the period from time T0 to time T3, no voltage is applied for detection of sensor signals, and the sensor output is zero. Although the sensor output gradually increases after time T3, sensor output values S remain much lower than the threshold S0. This is because at time T3, a considerable amount of PM has already been emitted as a result of the cold start of the engine E as well as the PM emissions after warming up are negligible. For this reason, the failure determination for the particulate filter 101 is not highly accurate.

By contrast, in the second embodiment shown in the lower part of FIG. 10, the engine E starts at time T0, after which PM accumulation starts. When the dryness determination ends at time T1, heating is started to remove the moisture (e.g., at 200° C.), and the moisture removal ends at time T2, prior to time T3. In this state, of the substances accumulated on the PM sensor 2 during the period from time T0 to time T1, the moisture is selectively removed, and the particulate matter, or a conductive component, remains. During the period from time T0 to time T2, at which the moisture removal by the heating ends, no voltage is applied for detection of sensor output signals, and the sensor output value S is zero. Then, when the detection of signals from the PM sensor 2 is started, the sensor output value S rises immediately due to the PM emitted during the cold start.

As a result, the difference, S−S1 (i.e., ΔS in the chart), between the sensor output value S and the initial value S1 exceeds the predetermined threshold S0, allowing failure determination. In this manner, the failure detection for the particulate filter 101 according to the present embodiment also ensures high accuracy by, during cold start, comparing the predetermined threshold S0 with the difference, S−S1, representing the PM emissions.

The present disclosure is not limited to the embodiments described above, but applicable to various embodiments without departing from the spirit and scope thereof. For example, although the above embodiments indicate applications to the internal combustion engine including a turbocharger and EGR mechanism, the system configuration including an internal combustion engine may be modified as appropriate. The internal combustion engine may not be a diesel engine, but may be a gasoline engine, a gas engine, or other engine. The internal combustion engine may also be used not only for an automobile but also for various applications. The structures of the PM sensor and the sensor element may also be modified as appropriate.

What is claimed is:

1. A failure detection apparatus for a particulate filter installed in an exhaust passage for an internal combustion engine, the apparatus comprising:
a sensor including
a particulate matter detection unit configured to allow, on a surface thereof, accumulation of particulate matter contained in an exhaust gas having passed through the particulate filter, and output a signal corresponding to an amount of the accumulated particulate matter, and
a heater unit configured to heat the particulate matter detection unit;
an output storage unit configured to store an output value from the sensor as an initial value for a next start when or while the internal combustion engine is stopped;
a start detection unit configured to determine start of the internal combustion engine;
a dryness determination unit configured to determine whether the exhaust gas contains water droplets while the internal combustion engine is in operation;
a heating control unit configured to, in response to the exhaust gas being determined to contain no water droplets after the next start of the internal combustion engine, activate the heater unit to heat the particulate matter detection unit to a first temperature allowing the accumulated particulate matter to remain and moisture included in the particulate matter to be removed; and
a failure determination unit configured to determine whether the particulate filter has a failure based on a difference between the initial value and an output value from the sensor after the heating by the heating control unit.

2. The failure detection apparatus for a particulate filter according to claim 1, wherein
the first temperature is 100° C. or more and less than 500° C.

3. A failure detection method for a particulate filter installed in an exhaust passage for an internal combustion engine, the method comprising:
arranging a sensor downstream of the particulate filter, the sensor including
a particulate matter detection unit configured to allow, on a surface thereof, accumulation of particulate matter contained in exhaust gas having passed through the particulate filter, and output a signal corresponding to an amount of the accumulated particulate matter, and
a heater unit configured to heat the particulate matter detection unit;
an output storage step for storing an output value from the sensor as an initial value for next start when or while the internal combustion engine is stopped;
a start determination step for determining start of the internal combustion engine after the output storage step;
a dryness determination step for determining whether the exhaust gas contains water droplets while the internal combustion engine is in operation after the next start;
a heating step for, in response to the exhaust gas being determined to contain no water droplets in the dryness determination step, activating the heater unit to heat the particulate matter detection unit to a first temperature allowing the accumulated particulate matter to remain and moisture included in the particulate matter to be removed; and
a failure determination step for determining whether the particulate filter has a failure based on a difference between the initial value and an output value from the sensor after the heating in the heating step.

4. The failure detection method for a particulate filter according to claim 3, wherein
the first temperature is 100° C. or more and less than 500° C.

* * * * *